G. A. BARON.
Cream-Pump
No. 202,778. Patented April 23, 1878.
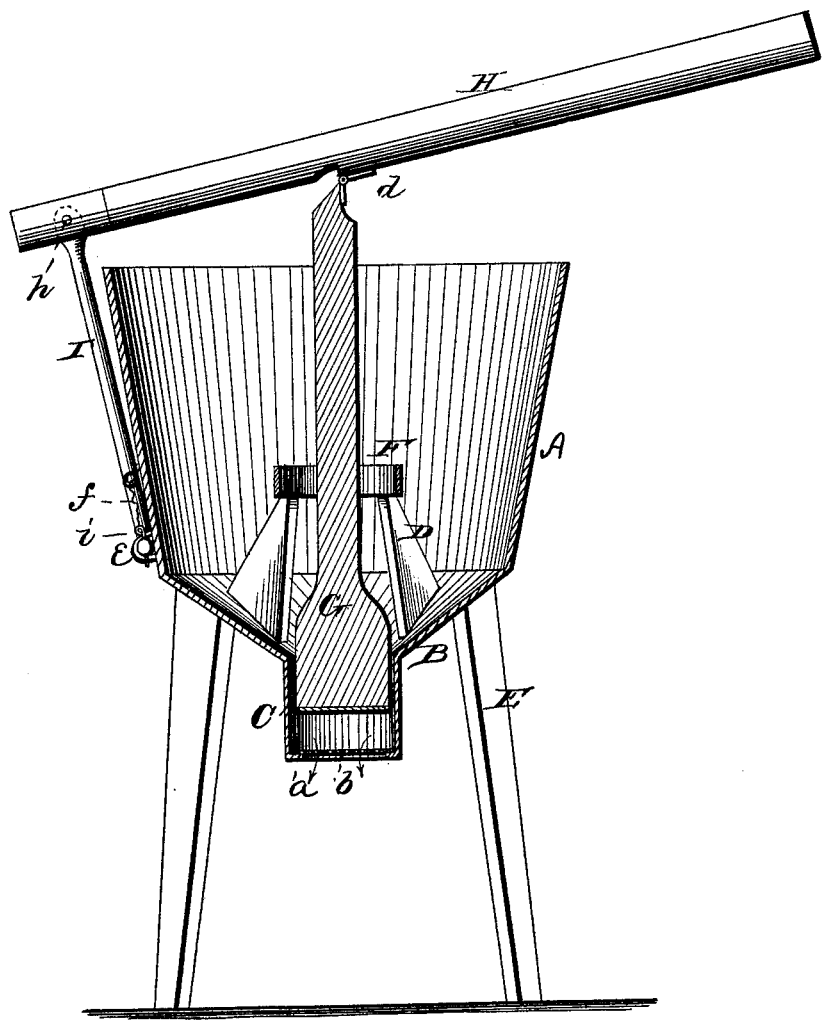

UNITED STATES PATENT OFFICE.

GUSTAVUS A. BARON, OF GOUVERNEUR, NEW YORK.

IMPROVEMENT IN CREAM-PUMPS.

Specification forming part of Letters Patent No. 202,778, dated April 23, 1878; application filed February 16, 1878.

*To all whom it may concern:*

Be it known that I, GUSTAVUS A. BARON, of Gouverneur, in the county of St. Lawrence, and in the State of New York, have invented certain new and useful Improvements in Cream-Pumps; and do hereby declare that the following is a full, clear, and exact description thereof, reference being had to the accompanying drawings, and to the letters of reference marked thereon, making a part of this specification.

The nature of my invention consists in the construction and arrangement of a cream-pump for breaking up the hard lumps and white caps in cream before churning, as will be hereinafter more fully set forth.

In order to enable others skilled in the art to which my invention appertains to make and use the same, I will now proceed to describe its construction and operation, referring to the annexed drawing, which represents a longitudinal vertical section of my cream-pump.

A represents the can or vessel, of any suitable dimensions, provided with a funnel-shaped bottom, B, from the center of which projects downward a cylinder, C, as shown. The vessel A is provided with legs E, for supporting the same in a sufficiently elevated position to allow a pan or other vessel to be placed under the cylinder for catching the cream.

In the lower end of the cylinder C is an inwardly-projecting circumferential flange, a, upon which rests a strainer, b, of wire-cloth. On the bottom B are fastened upwardly-extending guides D D, the upper ends of which support a ring or band, F. These parts form a guide for the plunger G, to cause the same at all times during operation to enter the cylinder.

The plunger G is made solid, and its upper end is, by means of a hinge, d, connected to the operating-lever H.

I is an iron rod to form the connection of the lever H with the vessel A. On the outside of said vessel, near the bottom, or at any other suitable point, is a horizontal tube or eye, e, rigidly fastened thereto. The lower end of the rod I is bent at right angles and passed through the eye e, after which a pin, i, is passed through a hole in the end of the rod, to prevent the same from coming out. This pin i is connected to the vessel or the rod by a cord or chain, f, so that it cannot be lost.

The upper end of the rod I is flattened and pivoted in a slot or mortise in the end of the lever H, as shown at h.

By the joints at e, h, and d the movement of the plunger G, by the working of the lever H, is always vertically up and down.

The entire machine is durable, simple in construction, and efficient in operation.

I do not broadly claim a plunger connected to a shaft, and operated by a lever connected to a vessel having a conical bottom with strainer attached, as I am aware that such is not new.

Having thus fully described my invention, what I claim as new, and desire to secure by Letters Patent, is—

In a cream-pump, the vessel A, with conical bottom B, from which depends a cylinder, C, with an interior flange, a, and the removable wire-cloth strainer b loosely resting on the flange a, in combination with the plunger G, the operating-lever H, having the plunger hinged to it, and the removable rod I, pivoted at its lower end to an eye, e, on the outside of the vessel A, and its upper end pivoted in a slot in the end of the operating-lever, all constructed as and for the purposes herein set forth.

In testimony that I claim the foregoing I have hereunto set my hand and seal this 23d day of January, 1878.

GUSTAVUS A. BARON. [L. S.]

Witnesses:
GEORGE M. GLEASON,
J. M. REYNOLDS, Jr.